United States Patent Office 3,320,211
Patented May 16, 1967

3,320,211
POLYCARBONATES OF HYDROXY ETHYL ETHERS
William E. Bissinger, Akron, Franklin Strain, Barberton, and Henry C. Stevens and William R. Dial, Akron, Ohio, and Raymond S. Chisholm, Pittsburgh, Pa., assignors to Pittsburgh Plate Glass Company, Pittsburgh, Pa., a corporation of Pennsylvania
No Drawing. Continuation of applications Ser. No. 698,055, Nov. 22, 1957, Ser. No. 113,628, May 31, 1961, and Ser. No. 185,796, Apr. 9, 1962, now Patent No. 3,215,668, dated Nov. 2, 1965. This application Sept. 17, 1965, Ser. No. 488,286
3 Claims. (Cl. 260—47)

This application is a continuation of applications Serial No. 185,796, filed April 9, 1962, now U.S. Letters Patent No. 3,215,668; Serial No. 113,628, filed May 31, 1961, now abandoned; and Serial No. 698,055, filed November 22, 1957, now abandoned.

This invention relates to novel types of synthetic resins and to the preparation of these materials. According to this invention, synthetic resins of unusual toughness and high molecular weight have been obtained. A large portion of the resins herein contemplated are thermosetting in addition to having the high toughness and molecular weight characterizing all of these resins. Such thermosetting resins have little or no solubility in organic solvents and resist melting or remaining substantially unmelted when heated to temperatures above 100° C., for example, 110° C. to 200° C. Other resins contemplated herein are thermoplastic and can be formed under heat and/or pressure. Such resins also are characterized by their toughness, good electrical properties, and other advantageous properties.

According to this invention, novel resinous polycarbonate esters of an alkylidene bis phenol which contain carbamate or amide groups have been produced. Some of these resins contain the general structure:

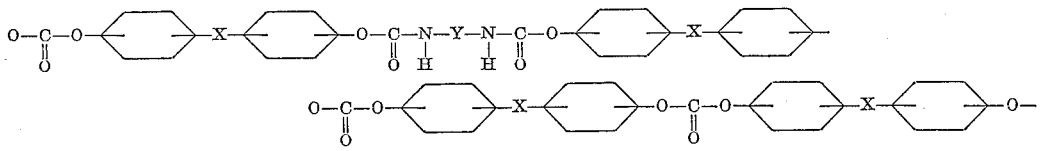

where X is the link or linking radical between a pair of phenyl radicals, Y is the link or linking radical between the nitrogens, such as the radical of a diamine. Thus, it will be seen that the polymer is a mixed polymeric ester of (A) bis phenol and (B) carbonic acid, and the theoretical bis carbamic acid having the structure:

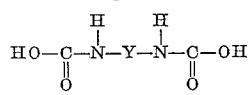

Y being the linking radical between the carbamic acid groups.

The ratio of the carbamate groups

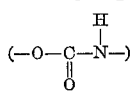

to the carbonic groups

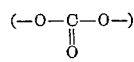

should be such that the carbonic groups are substantially in excess. Normally, the number of carbonic groups are at least about twice the number of carbamate groups and may be as high as 20 or even 50 times the number of carbamate groups.

The carbamate-carbonate esters of the alkylidene bis phenol may be prepared in various ways. For example, a bis chloroformate of a bis phenol may be reacted with a diamine and a dihydroxy compound which contains two hydroxy groups capable of reacting with chloroformate to form carbonate esters. In this case, about 2 to 20 or even as high as 50 equivalents of the dihydroxy compound are used per equivalent of diamine.

The type of resin obtained depends upon the manner by which the reaction is conducted. Since the amine normally is more reactive than the hydroxy compound (bis phenol or glycol), the amine normally reacts to a greater degree than the hydroxy compound when the bis phenol chloroformate is added to a mixture of the two. In such a case, the resin obtained is in essence two resinous esters (block polymers) linked together, the one being a polymeric ester of the bis phenol and the theoretical carbamic acid mentioned above, the other being the polycarbonate of the bis phenol and the hydroxy compound. Such a resin consists essentially of blocks or chains of the two types of polymeric esters. A similar type of material is obtained when the diamine is mixed first with the polychloroformate of the bis phenol, and the dihydroxy compound added later.

A more regular alternation of carbonate and carbamate groups in the chain can be achieved by separately adding the diamine and the bis chloroformate compound to a pool of the dihydroxy compound containing the hydrogen chloride acceptor, each being added at a relatively slow and controlled rate. Thus, the amine and the bis chloroformate may be added to a pool of the chloroformate at relative rates proportional to the total moles of chloroformate, hydroxy compound, and amine to be used. For example, if one mole of diamine and one mole of dihydroxy compound are to be reacted with 2.2 moles of the bis phenol bis chloroformate, a pool of the dihydroxy compound and an excess of hydrogen halide acceptor, for example, 5.5 moles of aqueous sodium hydroxide, sodium carbonate or bicarbonate, is established. Thereafter, the one mole of diamine and 2.2 moles of bis chloroformate are added gradually and simultaneously at a rate such that, during any period during the addition, 2.2 moles of bis chloroformate are being added per mole of diamine.

If desired, the proportionate rate of addition of the bis chloroformate may be faster than the rate of adding the amine, i.e., the proportionate rate per minute of addition of chloroformate and amine on a mole basis is not substantially less than the molecular proportion of the total chloroformate to total amine to be added.

The following are typical examples:

*Example I*

The bis chloroformate of bis phenol A (a condensation product of acetone and phenol, otherwise known as p-p'-isopropylidene-diphenol—see Merck Index, 6th edition) is prepared as follows:

Two hundred grams of phosgene is dissolved in 2000 cubic centimeters of toluene at 5° C. Then, 228 grams of bis phenol A in 1000 cubic centimeters of dioxane is added, followed by the addition of a solution of 242 grams of dimethyl aniline in 240 cubic centimeters of dioxane. During the addition of the dimethyl aniline solution, the temperature rises to 47° C. Then heat is finally applied to raise the temperature to 85° C. for three hours. The mixture is allowed to stand overnight.

Two liquid phases are thus produced. The lower dimethyl aniline hydrochloride phase solidifies and is filtered off. The filtrate is topped at reduced pressure at 50° C., first at 85 millimeters and then at 1 millimeter absolute pressure, until no more solvent is collected. The solid bis chloroformate of bis phenol A is thus produced. This material is purified by recrystallization from methylene chloride.

A sodium phenate solution is prepared by mixing one mole of bis phenol A with 500 grams of sodium hydroxide as an aqueous solution of sodium hydroxide containing 10 percent by weight of NaOH and 600 milliliters of methylene chloride at a temperature of 25° C. to 30° C. One mole of p-p'-diaminodiphenylmethane and 600 milliliters of methylene chloride is added to this solution.

Thereupon, 3.5 moles of bis phenol A bis chloroformate in 1500 milliliters of methylene chloride is added to the mixture while maintaining the temperature at about 25° C. to 30° C. The resultant viscous, white reaction mixture is stirred for an additional hour after addition of the chloroformate has been completed, and the mixture is allowed to stand for 14 hours. The reaction mixture is diluted with 5000 milliliters of methylene chloride and washed thoroughly with six 5000-milliliter portions of water in a separating funnel. The mixture is then washed with an aqueous solution which contains 3 percent by weight of pyridine and 2 percent by weight of NaOH. Thereafter it is washed to neutrality with a dilute aqueous hydrochloric acid solution and thereafter washed with water. The solvent is evaporated and a viscous, resinous, solid polymer is obtained.

*Example II*

The process of Example I is performed using the same materials except that the procedure of adding the reactants is different. In this example, separate streams of the bis phenol A chloroformate and of the p-p'-diaminodiphenylmethane are added gradually to the methylene chloride solution containing the sodium phenate of the bis phenol (the reaction product of the bis phenol and the sodium hydroxide). The rates of addition of the chloroformate solution and the amine solution are so proportioned that the entire amounts of each material are added during the same period of time. That is, the number of millimoles of chloroformate introduced into the solution per minute is approximately 3.5 times the number of millimoles of amine introduced per minute therein.

*Example III*

The process of Example II is performed using one mole of hexamethylene diamine in lieu of p-p'-diaminodiphenylmethane.

*Example IV*

The process of Example II is followed except that 1.8 moles of bis phenol A and 0.2 mole of the p-p'-diaminodiphenylmethane is used in lieu of the amount set forth in Example I.

The above processes produce tough resins which can be molded at temperatures in the range of 150° C. to 200° C. under pressure.

When 0.1 to 1 mole (for example, 0.5 mole) of 4,4'-diisocyanates-3,3'-dimethyl biphenyl (commercially known as "TODI") or like diisocyanate is intimately mixed with any of these resins and the mixture molded at 200° C. and held at 200° C. for 30 minutes, clear tough, insoluble, essentially infusible polymers are produced.

The above are typical examples of the manner in which the resins herein contemplated may be prepared. Various alkylidene bis phenols can be used in equivalent amount in lieu of bis phenol A in the above examples. These include:

(4,4'-dihydroxy-diphenyl)-methane
1,1-(4,4'-dihydroxy-diphenyl)-cyclohexane
2,2'-methylene bis(4-methyl-6-tertiary butyl phenol)
2,2'-methylene bis(4-ethyl-6-tertiary butyl phenol)
4,4'-butylidene bis(3-methyl-6-tertiary butyl phenol)
4,4'-thiobis(3-methyl-6-tertiary butyl phenol)
1,1-(4,4'-dihydroxy-3,3'-dimethyl-diphenyl)-cyclohexane
2,2-(2,2'-dihydroxy-4,4'-di-tert-butyl-diphenyl)-propane
3,4-(4,4'-dihydroxy-diphenyl)-hexane
1,1-(4,4'-dihydroxy-diphenyl)-1-phenyl-ethane
2,2-(4,4'-dihydroxy-diphenyl)-butane
2,2'-(4,4'-dihydroxy-diphenyl)-pentane
3,3'-(4,4'-dihydroxy-diphenyl)-pentane
2,2'-(4,4'-dihydroxy-diphenyl)-3-methyl-butane
2,2'-(4,4'-dihydroxy-diphenyl)-hexane
2,2'-(4,4'-dihydroxy-diphenyl)-4-methyl-pentane
2,2'-(4,4'-dihydroxy-diphenyl)-heptane
4,4-(4,4'-dihydroxy-diphenyl)-heptane
2,2-(4,4'-dihydroxy-diphenyl)-tridecane
2,2-bis(3,5-dichloro-4-hydroxy phenyl)-propane
2,2-bis(tetrachloro hydroxy phenyl)-propane
2,2-bis(3-chloro-4-hydroxy phenyl)-propane Moreover, the corresponding bis chloroformates of these bis phenols may be used in equivalent amount in lieu of bis phenol A bis chloroformate.

In addition, various other diamines can be used in lieu of the amines of the above examples, also in equivalent amount. Of particular interest are the amines which contain the group

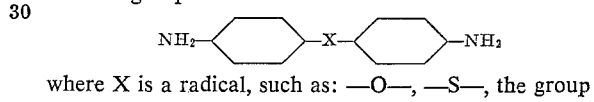

where X is a radical, such as: —O—, —S—, the group

or a hydrocarbon radical or substituted divalent hydrocarbon radical which rarely conhtains fore than 8 carbon atoms linking the two aniline groups

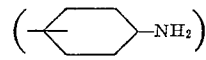

together. Some of these materials are prepared, as is understood by the art, by condensing aniline with an aldehyde, such as formaldehyde, acrolein, butryaldehyde, and like aldehydes containing up to about 8 carbon atoms, or a ketone such as acetone, methyl ethyl ketone, or like ketones containing up to about 8 carbon atoms. Some of these compounds are in monomeric form, others are in more complex polymeric form but contain two or more imino or amino groups.

Other diamines which can be used in lieu of amines used in Examples I to IV include the aliphatic diamines, such as ethylene diamine, hexamethylene diamine, propylene diamine, trimethylene diamine, tetramethylene diamine, 4,4'-diamino-dicyclohexyl methane, bis (ω amino alkyl) sulphides, 2,4-diamino tetrahydrofurane, 1,4-diamino cyclohexane, as well as the aromatic diamines, such as o-phenylene diamine, 4,4'-diamino diphenyl ether, 4,4'-diamino benzophenone, 1,7-naphthylene diamine, piperazine, m-phenylene diamine, o-tolidine, m-tolidine, and the like.

Various dihydroxy compounds can be used in lieu of a portion of the bis phenol A listed above. These include the various bis phenols mentioned above as well as the various other dihydric alcohols or hydroxy compounds containing esterifiable hydroxy groups, such as ethylene glycol, diethylene glycol, triethylene glycol, tetraethylene glycol, propylene glycol, 1,3-propane diol, 1,4-butane diol, phthallyl alcohol, 1-butene-3,4-diol, 1,4-butene diol, resorcinol, catechol, thiodiglycol, and the like.

According to a further method of producing a resin of the type contemplated above, an alkylidene bis phenol, such as bis phenol A, may be reacted in part with phosgene in the presence of a hydrogen chloride acceptor, such as an alkali metal or alkaline earth metal hydroxide, carbonate or bicarbonate, or an amine, and usually in the presence of a halogenated hydrocarbon solvent, such as methylene dichloride. This results in the production of a polycarbonate of relatively low molecular weight having free chloroformate groups. Thereafter, a diamine, such as one of the diamines listed above, with or without more bis phenol, may be added and the mixture allowed to stand or is heated until further reaction has taken place. The amount of diamine thus added can be up to one mole (usually not over 0.5 mole) of the diamine per mole of chloroformate

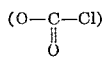

in the product.

The following is a typical example of the process herein contemplated:

*Example V*

Two thousand, one hundred milliliters of deionized water, 5.28 moles of sodium hydroxide, and 1.805 moles of bis phenol A are placed in a flask. To this mixture is added 1350 milliliters of methylene chloride. The mixture is held at a temperature of 25° C. and 2.2 moles of phosgene is introduced at a constant rate over a period of about 3.25 hours while maintaining the temperature at about 25° C. The chloroformate chlorine content of the resulting resin is about 2.5 percent and the product thus corresponds to an average molecular weight of approximately 2900. To a portion of the solution containing 100 grams of the resulting resin is added 0.02 mole of ethylene diamine.

The resulting reaction mixture is then allowed to stand at 25° C. with stirring for a period of about 5 hours, and is heated at reflux temperature for 3 hours. Thereafter, the organic phase is recovered, washed with water to remove entrained salts, and the resulting solution is heated to evaporate the solvent. The resulting product is a powder which can be molded at 200° C. and at a pressure of 2000 pounds per square inch to produce a tough polymer. Films cast from a methylene chloride solution of the polymer are colorless, clear, and strong.

It is to be understood that the process set forth in Example V can be performed using various other amines in equivalent amounts in lieu of ethylene diamine. The amines and dihydroxy compounds which may be used are those listed above.

According to a further method, a mixture of the bis phenol, such as bis phenol A, with a diamine, such as methylene bis aniline or hexamethylene diamine may be reacted with a bis chloroformate of another dihydric compound. Typical bis chloroformates suitable for this purpose include the bis chloroformates of the alkylene glycols, such as ethylene glycol bis chloroformate, diethylene glycol bis chloroformate, triethylene glycol bis chloroformate, tetraethylene glycol bis chloroformate, 1,4-butane diol bis chloroformate, resorcinol bis chloroformate, phthallyl alcohol bis chloroformate or the like. The reaction is usually conducted in the presence of an acid acceptor, such as an alkali metal hydroxide or carbonate.

Here, again, the type of resin produced depends upon the order of addition of the reactants, a block type of polymer of the type discussed above being obtained when the amine is first reacted with the chloroformate as in Example I, and a more regular alternation of carbamate and carbonate groups being obtained when the bis chloroformate and the amine are added to the pool of the sodium phenate as in Example II.

The following are typical examples:

*Example VI*

A mixture of 1 mole of bis phenol A, 1 mole of methylene bis aniline hydrochloride, 2.2 moles of diethylene glycol bis chloroformate, and 3000 grams of methylene dichloride is placed in a flask and 7.5 moles of sodium hydroxide as an aqueous solution containing 50 percent by weight of NaOH is added while holding the mixture at 5° C. The product is allowed to stand at 25° C. for 4 hours and is recovered by washing with water and evaporating the solvent. The resulting product is a resinous material which, on molding at 175° C. under a pressure of 2000 pounds per square inch, forms a tough molding. When heated with 5 percent by weight of toluene-2,4-diisocyanate under pressure of 1000 pounds per square inch at a temperature of 200° C., an infusible polymer is obtained.

*Example VII*

The process of Example VI is performed using 1 mole of hexamethylene diamine in lieu of methylene bis aniline.

*Example VIII*

One mole of bis phenol A is mixed with 5.5 moles of an aqueous solution of sodium hydroxide (containing 10 percent by weight of NaOH) and 600 milliliters of methylene chloride. The mixture is held at a temperature of 25° C. to 30° C. while 2.2 moles of diethylene glycol bis chloroformate and 1 mole of p,p'-diaminodiphenylmethane dissolved in 600 milliliters of methylene chloride are separately added thereto simultaneously over the same period of time. The mixture is recovered as in Example I.

A tough resin is obtained which cures to an infusible state when mixed with 1,5-naphthalene diisocyanate, the mixture molded and heated at 200° C. for 3 hours at a pressure of 2000 pounds per square inch.

Any of the other amines listed above may be used in equivalent amount in lieu of those mentioned in Examples VI and VIII. Bis phenol A may be replaced in equivalent amount by other bis phenols listed above and other bis chloroformates, such as ethylene bis chloroformate, 1,4-butane diol bis chloroformate, etc., including those listed above, may replace equivalent amounts of diethylene glycol bis chloroformate in the Examples VI to VIII.

As shown above, the various carbonate polymers which contain carbamate groups such as described above are fusible and soluble in organic solvents. This is an advantageous property during the period during which the resin is under preparation and/or processing for use.

These polymers can be converted to a state where they are essentially insoluble in inorganic solvents and where they are essentially infusible, or at least do not readily fuse at temperatures below their decomposition temperature, by mixing the polymer described above with an organic diisocyanate. Typical diisocyanates which may be used for this purpose include 1,5-naphthalene diisocyanate, tolylene diisocyanate, ethylene diisocyanate, trimethylene diisocyanate, tetramethylene diisocyanate, hexamethylene diisocyanate, decamethylene diisocyanate, heptylidene diisocyanate, and the corresponding diisothiocyanates: cycloalkylene diisocyanates and diisothiocyanates, e.g. cyclopentylene diisocyanate, cyclohexylene diisocyanate; aromatic diisocyanates and diisothiocyanates, e.g. m-phenylene diisocyanate, naphthalene diisocyanate, and diphenyl-4,4'-diisocyanate; aliphatic-aromatic diisocyanates and diisothiocyanates, e.g. xylene-1,4-diisocyanate, 4,4'-diphenylene-methane diisocyanate, and cyclopentyl diisocyanate; and diisocyanates and diisothiocyanates containing hetero-atoms.

The preferred diisocyanates and diisothiocyanates are of the type OCN—R—NCO and SCN—R—NCS, wherein R represents saturated divalent hydrocarbon radicals with a chain length of at least two (rarely more than 12) carbon atoms.

The amount of the isocyanate so added normally ranges between about 0.1 to 1 mole of isocyanate groups per mole of reactive hydrogen such as present in carbamate and hydroxyl groups of the polycarbonate polymer subjected to treatment. The isocyanate may be incorporated by grinding or otherwise pulverizing the polymer and incorporating the isocyanate. Alternatively, the isocyanate may be added to the organic solution prior to evaporation of the solution. In such a case, however, the evaporation of the solvent should be conducted at a relatively low tempertaure, for example, 50° C. or lower.

At all events, the desired cured polymer is prepared by heating the polycarbonate-carbamate mixture with the diisocyanate at an elevated temperature, usually above 75° C. and rarely above 300° C. The resulting products retain to a large degree the inherent toughness of the polycarbonate subjected to treatment and at the same time exhibit little tendency to fuse upon heating. They are either inert to organic solvents or are only swelled by such solvents.

According to a further embodiment of the invention, carbonic polyesters of alkylidene bis phenols, such as those listed above, which are polymerizable with peroxide under the influence of ultraviolet light may be prepared. These materials contain the polymerizable ethylenically unsaturated group C=C in combination with the polycarbonate chain.

Unsaturated polycarbonates such as herein contemplated may be prepared by reaction of a bis phenol with a chloroformate of an unsaturated dihydroxy compound, for example, a glycol such as erythrol, 1,3-cyclopentadiene diol, 2-butene-1,4- diol, or a more complex dihydroxy unsaturated compound, such as allyl tartarate, methallyl tartarate, etc., with a bis phenol of the type listed above. Alternatively, a chloroformate of a bis phenol can be reacted with an unsaturated glycol or a mixture of the unsaturated glycol with a bis phenol, or an unsaturated bis phenol may be reacted with phosgene or a bis chloroformate.

The following examples are typical:

*Example IX*

One mole of erythrol, 2.5 moles of pyridine, and 1500 milliliters of benzene is placed in a flask. To this mixture a solution of one mole of bis phenol A chloroformate in 1500 milliliters of benzene is added gradually over a period of about 2 hours while maintaining the temperature of the mixture at about 25° C. to 30° C. The mixture is stirred for 2 hours and then poured into water and washed to neutrality.

*Example X*

1-butene-3,4 diol chloroformate is prepared by slowly adding 1-butene-3,4 diol to a refluxing pool of phosgene until the temperature of the pool rises to about 15° C., and thereafter adding phosgene and the diol to the pool at a rate such as to maintain the temperature of the pool at about 15° C., substantially as disclosed in U.S. Patent No. 2,476,637.

One mole of bis phenol A, one mole of 1-butene-3,4 diol bis chloroformate, and 1000 milliliters of methylene chloride are mixed together and 3 moles of aqueous sodium hydroxide is slowly added. Two grams of pyridine is added to the resulting mixture and the resin is recovered as in the preceding examples.

The organic phase is removed and is washed to remove dissolved salts.

Glycerine monoallyl ether can be used for all or a part of the diol in the above Examples IX and X.

The resulting resins are tough, transparent, thermoplastic materials which contain polymerizable unsaturated groups. When recovered by evaporation of solvent, they are solid and moldable at 200° C. under pressure of 2000 pounds per square inch. They are clear and colorless. These products may be dissolved in a solvent and 1 to 5 percent by weight of a peroxide polymerization catalyst, such as t-butyl peroxide, cumene hydroperoxide, acetone peroxide or the like added thereto, and the solution flowed to form a film and the solvent vaporized. The resulting film may be cured by heating the mixture at a temperature at which the peroxide catalyzes polymerization of unsaturated groups.

According to another embodiment, 100 grams of a mixture of 2 parts by weight of propylene maleate phthalate with one part by weight of styrene stabilized with 0.003 part by weight of trimethylbenzyl ammonium chloride may be mixed with a quantity of erythrol-bis phenol polycarbonate solution containing 100 grams of the polycarbonate produced as in Example X. This maleate phthalate styrene mixture is prepared substantially as described in Example XXVI of U.S. Patent No. 2,593,787, granted to Earl E. Parker. Thereupon, methylene chloride is fractionated from the mixture, leaving a resinous mixture. To this resinous mixture there is added 3 percent by weight of benzoyl peroxide and the mixture is placed in a mold. The mold is then heated at 70° C. for 24 hours and thereafter the temperature is gradually raised over a period of 24 hours to 105° C. A hard, transparent, tough, essentially infusible, insoluble polymer is produced.

A further type of unsaturated polycarbonate which may be prepared according to the inventions herein contemplated are those produced using unsaturated bis phenols which contain unsaturated groups in an aliphatic (including cycloaliphatic) radical, and preferably in a radical having a terminal

group which is linked either directly to a carbon of the aromatic group or is a part of the radical linking the phenol groups of the bis phenol. As a typical example, alkenyl phenol may be condensed with aldehydes, such as formaldehyde, or ketones such as acetone, methyl ethyl ketone, methyl vinyl ketone or like ketones, to produce the corresponding unsaturated bis phenols. These bis phenols have the following general formula:

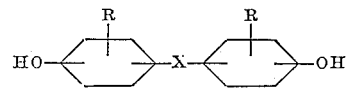

where X is the linking radical and R is an aliphatically unsaturated radical.

These alkenyl or cycloalkenyl groups should not contain more than about 6 carbon atoms. They may be hydrocarbon radicals or halohydrocarbon radicals. As a typical example, 2-butenyl phenol or 3-butenyl phenol may be condensed with formaldehyde or acetone to produce the corresponding bis(butenyl phenol). The butenyl group may contain unsaturation either between the second and third carbon atoms or the third and fourth carbon atoms of the radical.

Other unsaturated phenols which may be condensed with acetone or formaldehyde to produce similar bis phenols are 2-allyl phenol, 3-allyl phenol, 2-cyclopentenylphenol, 4-allyl phenol, 4-butenyl phenol, etc.

The following example is illustrative:

*Example XI*

The bis phenol corresponding to butenyl phenol is prepared as follows:

The butenyl phenol which is used has the following structure:

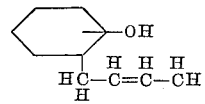

A 3-necked flask equipped with a stirrer, watercooled condenser, and thermometer, is charged with 5.6 moles of the phenol and 0.75 mole of acetone. The temperature of the stirred mixture is raised to about 40° C. by heating, and hydrogen chloride gas is bubbled into the liquid mixture. This is continued for about 2 hours. The resulting mixture is stirred for about 20 hours at 35° C. to 40° C.

The reaction mixture is diluted with xylene and allowed to crystallize. Thereafter, the reaction mixture is filtered to recover the crystals which was washed with 150 grams of phenol heated to 45° C. After washing, the product is heated to 210° C. at an absolute pressure of 2 to 3 millimeters to remove unreacted phenol.

The resulting product is the bis phenol having the following apparent structure:

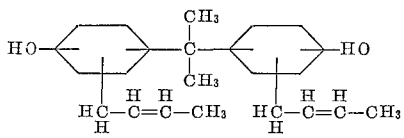

1.8 moles of the butenyl bis phenol thus obtained, 2000 milliliters of deionized water, and 5.28 moles of sodium hydroxide are placed in a flask. To this mixture is added 1350 milliliters of methylene chloride. The mixture is held at a temperature of 25° C., and 2.2 moles of phosgene is introduced at a constant rate over a period of about 3.25 hours by maintaining the temperature at about 25° C. Thereafter, the resulting resin is recovered by washing and vaporizing the solvent as described above.

This material is polymerizable through the unsaturated group and therefore may be thermoset by blending with a suitable catalyst, such as tertiary butyl hydroperoxide, cumene hydroperoxide, sulphur, or the like. The peroxide may be blended in the mixture by molding at an elevated temperature or it may be incorporated in the methylene chloride solution prior to vaporization of the solvent, and the solvent thereafter vaporized. Films can be conveniently produced which can be further cured by heat and/or ultraviolet or infra-red light.

*Example XII*

The process of Example V is performed except that 1.5 moles of bis phenol A and 0.305 mole of the butenyl phenol described in Example XI are used in place of 1.805 moles of bis phenol A. The resulting product contains unsaturated groups which are active for the production of thermosetting resins, as described heretofore and hereinafter.

In lieu of the butenyl phenol used in Example XI, it is to be understood that other alkenyl phenols can be used. A typical phenol of this character is 2-vinyl phenol. Moreover, complex phenols which contain more complex unsaturated phenols, including the unsaturated esters of the salicylic acids, such as vinyl salicylate, allyl salicylate or the partial esters or ethers, such as the monovinyl ether of catechol or resorcinol, or the corresponding monoallyl other of catechol or resorcinol. The unsaturated salicylates and the unsaturated ethers mentioned above are particularly valuable because of their greater tendency to polymerize through the unsaturated group. Thus, especially active products can be prepared by using allyl or vinyl salicylate or catechol monovinyl ether in lieu of butenyl phenol in the practice of Example XI.

As shown in Example XII, the unsaturated bis phenols mentioned above may be used in conjunction with bis phenol A or like bis phenol which is free from aliphatic unsaturation to produce mixed polycarbonates simply by substituting a portion of the unsaturated bis phenol for a portion of the bis phenol A or like bis phenol which is free from aliphatic unsaturation.

In lieu of acetone in the above Example XII, methyl vinyl ketone may be used.

The unsaturated polycarbonate described above also may be blended with other polymerizable unsaturated liquids, such as styrene, ethylene glycol dimethacrylate, diallyl maleate, diallyl phthalate, vinyl acetate, other glycol maleates or fumarates or the like. Thermoset moldings may be prepared by mixing the unsaturated polycarbonate with the peroxide, with or without other polymerizable solids or liquids, molding the mixture, and polymerizing the product with heat, and with or without heat or pressure. The polycarbonate herein contemplated may also be further cured by radiation with beta or gamma radiation, such as by exposure to cobalt 60. Various other peroxides, such as acetone peroxide or isopropyl peroxydicarbonate, may be used.

In addition, these unsaturated polycarbonates may be treated with sulphur in order to produce a hard, tough, translucent material which is compatible both with vulcanized rubber and with polyisocyanate rubber. A quantity of the unsaturated polycarbonate, such as produced according to Examples IX to XII, may be mixed with 3 parts by weight of sulphur per 100 parts by weight of the polymer and the mixture formed into a sheet. This sheet or layer may be placed between a layer of unvulcanized GR–S rubber having the following composition:

| | Parts by weight |
|---|---|
| GR–S | 100.0 |
| Zinc oxide | 5.00 |
| Sulphur | 3.0 |
| AgeRite powder (phenyl beta-naphthylamine) | 1.0 |
| Altax (dibenzothiazyl disulfide) | 1.2 |
| Methyl tuads (tetramethyl thiuram disulfide) | 0.15 |
| Picco 100 (cumarone indene resin) | 15.0 |
| Diethylene glycol | 10.0 |
| Silica pigment | 58.5 | and a layer of a plastic curable isocyanate resin produced by reaction of toluene diisocyanate with a polybutylene oxide or glycol-polybasic acid polyester such as ethylene glycol adipate, the resin containing about 5 to 15 parts by weight of toluene diisocyanate. The mixture may then be heated at a temperature of 150° C. for 2 hours. The resulting product is found to be a tough, well-bonded laminate in which the layers firmly adhere to each other.

Mixed polycarbonate-polycarboxylic acid esters of bis phenols and analogous dihydroxy aromatic compounds may be prepared according to this invention. These polymeric esters may be unsaturated or saturated. When unsaturated, they may be polymerized or copolymerized as described above in connection with the polycarbonate ester of Examples X to XII. These materials, whether saturated or unsaturated, have the advantageous property that they show less tendency to crystallize than the corresponding esters of polycarboxylic acids, and possess toughness, high dielectric properties, and good stability.

Thus, mixed polycarbonate resins can be prepared by reaction of a bis chloroformate of a bis phenol, such as bis phenol A, with a polyester produced by reaction of a dihydric alcohol with a dicarboxylic acid or anhydride, the amount of the dihydric alcohol being in stoichiometric excess of the acid (usually in the range of 1.1 to 2.0 moles of dihydric alcohol per mole of the dicarboxylic acid) whereby to produce a polyester having terminal hydroxy groups. The reaction of the polyester with the bis chloroformate of bis phenol A, or other of the chloroformates of bis phenols listed above, preferably is conducted in the presence of an alkaline agent, such as pyridine or alkali metal hydroxide, an alkali metal carbonate, an alkaline earth metal hydroxide, an alkaline earth metal carbonate, a quaternary ammonium hydroxide or an amine. As a consequence, products of higher molecular weight are produced. Both low molecular weight polyesters containing as low as 2 repeating units or high molecular weight polymeric polyesters which contain 10 to 100 repeating units may be treated.

Low molecular weight esters which may be treated with bis chloroformate, as contemplated here, may be prepared by reaction of an excess of dihydric alcohol and a dicarboxylic acid for a short time and at a relatively low temperature. For example, 2 moles of a dihydric alcohol can be reached with 1 mole of a dibasic acid or anhydride such as phthalic anhydride, oxalic acid, maleic anhydride, fumaric acid, succinic acid, adipic acid, azelaic acid, terephthalic acid, itaconic acid or the like, substantially as follows:

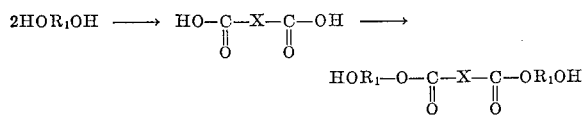

where $R_1$ is the radical of the dihydric alcohol and X is the group linking the carboxyl groups. The resulting product may be reacted with a bis chloroformate of a bis phenol or of another dihydroxy aromatic in the presence of an hydrogen chloride acceptor such as amine or alkali metal hydroxide, carbonate or bicarbonate.

Alternatively, the hydroxy ester can be reacted with phosgene to produce the corresponding chloroformate and the chloroformate may be reacted with the bis phenol or like dihydroxy aromatic.

The degree of esterification of the carboxylic acid may be carried to polymeric state. Thus, the proportion of the dihydric alcohol can be more than one mole but less than two moles per mole of dicarboxylic acid, and resins of various molecular weight having terminal hydroxy groups may be obtained by heating the mixture and distilling off evolved water. These polymeric esters may be reacted with chloroformate of a bis phenol or the like, to produce resins.

According to a further embodiment, a dihydroxy aromatic (a compound containing two OH groups linked to carbon atoms which are in an aromatic ring) such as a bis phenol, can be reacted with a dicarboxylic acid (including its anhydride) to produce hydroxy esters of the following types:

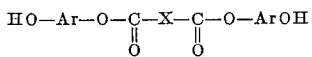

or

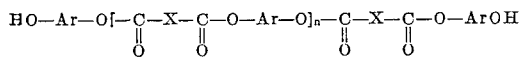

where Ar is the radical of the aromatic dihydroxy compound linking the hydroxy compounds thereof, X is the link between the carboxyl groups of the acid and $n$ is a number denoting the polymeric character of the ester.

This hydroxy ester may be further esterified by introduction of phosgene into a solution thereof in the presence of an hydrogen chloride acceptor or by reacting the ester with a bis phenol chloroformate in the presence of such acceptor.

The following examples are illustrative:

*Example XIII*

Two moles of hexamethylene glycol, one mole of terephthalic acid, and 1500 milliliters of ethylene chloride are placed in a flask and heated to distill off water azeotropically, the organic solvent being returned to the system until no further water is evolved. 1.2 moles of bis phenol A bis chloroformate and 3 moles of sodium hydroxide as an aqueous solution containing 10 per cent of NaOH is added to the resulting solution and the mixture is allowed to stand at room temperature for 24 hours, and then is washed with water. Solvent is distilled from the washed organic phase. The product is a solid which can be drawn into fibers or molded at 200° C. into a tough molding. It shows little tendency to crystallize.

*Example XIV*

One and one-tenth moles of hexamethylene glycol, 1 mole of terephthalic acid, and 1500 milliliters of ethylene chloride are placed in a flask and heated to distill off water azeotropically, and the mixture is heated to 200° C. The mixture is diluted with an additional 1500 milliliters of ethylene chloride. The solution is cooled to 0° C. and phosgene is bubbled into the solution at this temperature until no further phosgene is absorbed. Two moles of bis phenol A chloroformate, 1.5 moles of bis phenol A, and 5.5 moles of sodium hydroxide as an aqueous solution containing 10 percent of NaOH is added and the mixture is allowed to stand at room temperature for 24 hours. The resulting resin is recovered by vaporizing the solvent.

*Example XV*

Two moles of ethylene glycol, 1 mole of maleic anhydride, and 5000 milliliters of ethylene chloride are placed in a flask and the mixture heated at reflux temperature to distill off water azeotropically as in Example X until no further water is removed. Two moles of bis phenol A, 3.5 moles of bis phenol A bis chloroformate, and 9 moles of sodium hydroxide as an aqueous solution containing 10 percent of NaOH is added and the mixture is allowed to stand at room temperature for 24 hours. After washing and evaporation of solvent, a tough, resinous material, which is a readily moldable polymer, is obtained. When this product is mixed with 5 percent by weight of benzoyl peroxide or acetone peroxide and molded at 150° C. and 2000 pounds per square inch, a thermoset polymer is obtained.

Styrene in suitable amount, for example, one part by weight per two parts by weight of the polycarbonate resin prepared according to Example XIV, may be added prior to distillation of the solvent. Thereafter, the ethylene chloride may be volatilized off and the resulting polymer may be cast, polymerized, or used as a laminating syrup, using peroxide catalysts to polymerize the unsaturated compounds.

*Example XVI*

One and two-tenths moles of hexamethylene glycol, 1 mole of terrephthalic acid, and 1000 milliliters of ethylene dichloride are placed in a flask and heated to distill off water azeotropically until no further water is removed. Thereafter, the solution is held at 0° C. and phosgene is bubbled into the solution until no further phosgene is absorbed. Three-tenths mole of pyridine is added and the mixture allowed to stand for an additional 5 hours. Thereafter, the solution is washed with water to remove soluble salts and the washed organic phase is gradually heated to a temperature of 200° C. A solid, resinous material is obtained.

*Example XVII*

A charge was prepared by mixing 254 pounds of diethylene glycol, 98 pounds of maleic anhydride, 148 pounds of phthalic anhydride, and 70 pounds of xylene, in a reactor. The reactor is equipped with a stirrer, an inlet for inlet gases, and also a reflux condenser by means of which water in the reaction is separated off by azeotropic distillation, with the xylene being returned to the reaction zone. The charge is heated over a period of 2 hours, gradually up to a temperature of 150° C. Thereafter, the temperature is raised gradually over a period of 18 additional hours to a temperature of 190° C. A resin of low acid number is obtained.

The polyester thus produced is diluted with 400 pounds of methylene chloride and 80 pounds of pyridine is added to the solution. Thereupon, the mixture is cooled to 0° C. and 70 pounds of bis phenol A chloroformate is added and the mixture is allowed to stand for 48 hours at room temperature. Thereafter, the aqueous phase is removed, the organic phase washed to remove dissolved salts, and one part by weight of styrene per part of resin in the solvent is added. The solvent is then distilled off, a liquid polymerizable mixture of styrene and the polyester being obtained. One percent by weight, based upon the weight of the mixture, of benzoyl peroxide is added and the mixture is heated at a temperature of 70° C. for 2 hours. Thereafter, the temperature is gradually raised to 105° C. over a period of 24 hours. The resulting product is a clear, transparent polymer which is substantially infusible.

In lieu of bis phenol A or the choloroformate thereof, any of the other bis phenols, including those listed above and their chloroformates, respectively, may be used in molecularly equivalent quantity. Moreover, in the practice of Examples XI to XVII and their equivalents, other dihydroxy aromatic compounds, such as resorcinol, catechol, p-xylylene glycol, 4,4'-bis hydroxy diphenyl, 1,4-bis beta hydroxy ethyl benzene, and like materials, may be used in lieu of bis phenol A, and their bis chloroformates in lieu of bis phenol A bis chloroformate, in molecularly equivalent amount.

It will be understood that various equivalent materials may be used according to the processes illustrated in the above Examples XI to XVII. Thus, in lieu of the glycols therein mentioned, other dihydroxy compounds or glycols, such as ethylene glycol, diethylene glycol, triethylene glycol, 1,2 or 1,3-propylene glycol or the ethers of propylene glycol obtained by condensation of 2 or 3 moles thereof, phthalyl alcohol or butylene glycol can be used.

The dibasic acid or anhydrides used in such examples can be saturated or unsaturated and include phthalic acid, maleic acid, fumaric acid, succinic acid, adipic acid, azelaic acid, terephthalic acid, itaconic acid or like acid which is capable of reacting with a dihydroxy compound to produce a polymeric polyester. The glycol is normally used in substantial excess of the dibasic acid in order to provide hydroxy terminal groups, usually ranging from about 5 to 30 percent by weight in stoichiometric excess of the acid. Some portion of the solvent distills off in the course of production of the resin. However, the resulting polyester frequently contains substantial amounts of free hydroxy groups.

According to a further embodiment, polycarbonate resins may be prepared by reaction of a bis chloroformate of a bis phenol with a diepoxide. Suitable diepoxides which can be used for this purpose contain two 1,2-epoxy groups

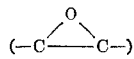

and include butadiene diepoxide, butadiene dimer diepoxide, glycidyl 3,4-epoxy butyrate, diglycidyl ether, etc.

The following is a typical example:

*Example XVIII*

One mole of bis phenol A bis chloroformate dissolved in one ilter of carbon tetrachloride is introduced into a three-necked flask provided with a stirrer and a water-cooled condenser. One mole of butadiene diepoxide (1,2,3,4-diepoxy butane) is added and then one cubic centimeter of pyridine is added and the mixture stirred vigorously, while maintaining the temperature at 0° C. The temperature of the reaction mixture is gradually raised to about 70° C. and is held at this temperature for about 4 hours. The mixture is then allowed to stand overnight at room temperature. The organic phase is washed with water, dried over magnesium sulfate, and the solvent is distilled off. A resinous product is obtained.

According to a further embodiment, mixed nitrogen-containing polycarbonates can be prepared by reaction of a bis chloroformate, such as a bis chloroformate of bis phenol A or like alkylidene bis phenol mentioned above, with hydrazine or a substituted hydrazine, such as phenyl hydrazine or the like.

The following are typical examples:

*Example XIX*

One mole of bis phenol A chloroformate and 500 milliliters of methylene dichloride are placed in a reaction vessel and one mole of hydrazine hydrate is gradually added while maintaining the temperature at about 0° C. Thereafter, the temperature is gradually raised to a temperature of 150° C., the solvent being distilled off. The resulting product is a hard, tough material.

*Example XX*

Twenty-one hundred milliliters of water, 5.28 moles of sodium hydroxide, and 1.805 moles of bis phenol A are mixed together and cooled to 25° C. Thirteen hundred and fifty milliliters of methylene chloride are added and the mixture is placed under a nitrogen atmosphere. Two and two-tenths moles of phosgene is passed in over a period of 3.25 hours with slight intermittent cooling to maintain the reaction temperature at 25° C. Thereupon, 20 grams of hydrazine hydrate are added. The reaction mixture thickens rapidly while it is being maintained at 25° C. It is thereafter diluted with additional methylene chloride, the solution washed as described above, dried over magnesium sulfate, and filtered, to yield a light yellow solution. The product, after removal of solvents, is an essentially colorless, tough polymer. When mixed with 5 grams of toluene diisocyanate, the product converts to a polymer of lower solubility.

Hydroxyl amine may be used in lieu of hydrazine in the above Examples XIX and XX.

Beta hydroxy ethers of bis phenols may be treated as herein contemplated. Thus, the bis phenol can be reacted with a 1,2-monoepoxide of an ethylenic hydrocarbon, such as ethylene oxide, propylene oxide, butylene oxide or butadiene monoepoxide under pressure to produce the corresponding bis(hydroxy ethyl ether):

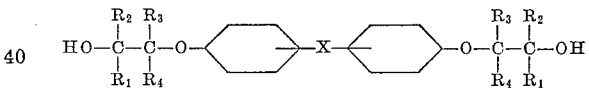

where $R_1$, $R_2$, $R_3$ and $R_4$ are the radicals linked to the epoxide

and X is the radical linking the phenol of the bis phenol.

These hydroxy ethers can be reacted directly with bis chloroformates, such as bis phenol chloroformates or aliphatic bis chloroformates to produce resins. Alternatively, they may be reacted with carboxylic acids, such as terephthalic acid, for example, in mole for mole proportions or in the proportion of one mole of terephthalic acid per 0.1 to 0.9 mole of bis phenol bis hydroxy ethyl ether. When less than mole per mole proportions are used, the reaction product may be further reacted with a chloroformate of a bis phenol in order to produce a resin.

The following examples are illustrative:

*Example XXI*

One mole of bis phenol A is mixed with 1000 milliliters of methylene chloride and 2 moles of monoepoxycyclopentadiene (prepared as described in a copending application of Malcolm Korach, Serial No. 653,051, filed April 16, 1957, now abandoned) was slowly added while maintaining the temperature of the reaction mixture at 35° C. The resulting mixture is allowed to stand overnight.

Thereupon, 1.5 moles of the bis chloroformate of bis phenol A is added to the resulting product while maintaining the temperature of the mixture at 15° C. Aqueous sodium hydroxide is added slowly until the mixture is slightly alkaline while the temperature thereof is held at 15° C. Five grams of trimethyl benzyl ammonium hydroxide is added and the mixture is allowed to stand at room temperature for 4 hours. After washing the organic phase, the solvent is evaporated and a high molecular weight polymer which fuses at 200° C. is obtained. When this polymer is pulverized, mixed with 3 percent by weight of sulphur and the mixture heated in a mold at 200° C. and a pressure of 1500 pounds per square inch for one hour, a tough polymer is obtained. This product is much less soluble in organic solvents than the polymer from which it is prepared.

Other bis phenols, including those listed above, may be used in this example in lieu of bis phenol A.

Other 1,2-epoxides, such as ethylene oxide, butadiene monoxide or propylene oxide may be used in lieu of cyclopentadiene monoepoxide. However, in such a case, the reaction between the bis phenol and the epoxide should be conducted at about 100° C. and under pressure.

The various resins which have been described above can be used for many purposes. For example, they may be used to provide laminated articles. Thus, the resins herein contemplated can be used to impregnate woven or felted fiber glass, linen or cotton cloth or the like, and the impregnated fabric may be built up into a laminate which may then be heated at the fusion temperature of the resin to bond the layers together. These laminates can be used as structural material for roofing, siding and other construction materials for buildings, boats, etc.

Where diisocyanate is included in the nitrogenous-containing polymers described above, the resulting laminate is quite rigid and shows little tendency to distort at temperatures of 125 to 150° C.

The various resins herein contemplated may be applied to metal as a coating which may be either in the form of solutions or in the form of a powder which is melted or fused onto the metal surface. Many of the products herein contemplated have unusually high dielectric strength at elevated temperatures and may be used for electrical purposes as electrical insulation materials. Thus, they can be molded to enclose and protect electrical conductors, connections, switches and the like. Since the products are clear and tough, they may be used for transparent windows. They may also be drawn into fibers for use in fabrics. Substantially, all of these materials form very tough, impermeable films.

Hence, they may be used to produce films suitable for use in wrapping food and other articles and for other purposes where films of polyethylene and regenerated cellulose are used.

Although the present invention has been described with reference to the specific details of certain embodiments, it is not intended that such details shall be regarded as limitations upon the scope of the invention except insofar as included in the accompanying claims.

What is claimed is:

1. A polycarbonate of (a) carbonic acid, (b) diol selected from the group consisting of aliphatic dihydric alcohols containing esterifiable hydroxy groups and alkylidene bis phenols and (c) a bis hydroxy alkyl ether of an alkylidene bis phenol and monoepoxy cyclopentadiene.

2. A sulfur curable polycarbonate of (a) carbonic acid, (b) an alkylidene bis phenol and (c) a bis hydroxy ethyl ether of an alkylidene bis phenol and monoepoxy cyclopentadiene.

3. A polycarbonate resin of (a) carbonic acid, (b) terephthalic acid, (c) a bis hydroxy ethyl ether of an alkylidene bis phenol and monoepoxy cyclopentadiene and (d) a bis phenol.

References Cited by the Examiner

UNITED STATES PATENTS

| | | | |
|---|---|---|---|
| 2,789,965 | 4/1957 | Reynolds et al. | 260—47 |
| 2,789,966 | 4/1957 | Reynolds et al. | 260—47 |
| 2,789,967 | 4/1957 | Reynolds | 260—47 |
| 2,999,844 | 9/1961 | Muller et al. | 260—47 |
| 3,030,331 | 4/1962 | Goldberg | 260—47 |
| 3,046,255 | 7/1962 | Strain et al. | 260—47 |
| 3,062,780 | 11/1962 | Rinke et al. | 260—47 |
| 3,169,121 | 2/1965 | Goldberg | 260—47 |

SAMUEL H. BLECH, *Primary Examiner.*